United States Patent [19]

Thompson

[11] 3,889,050

[45] June 10, 1975

[54] SUBSCRIPTION TELEVISION SYSTEM AND SWITCHING STATION THEREFOR

[75] Inventor: Wallace T. Thompson, El Paso, Tex.

[73] Assignee: GTE Sylvania Incorporated, Stamford, Conn.

[22] Filed: Apr. 11, 1974

[21] Appl. No.: 460,025

[52] U.S. Cl. ........... 178/5.1; 178/DIG. 13; 325/308

[51] Int. Cl. ............................................ H04n 1/44

[58] Field of Search ....... 178/5.1, DIG. 13; 325/308

[56] References Cited

UNITED STATES PATENTS

| | | | |
|---|---|---|---|
| 3,230,302 | 1/1966 | Bruck et al. | 178/5.1 |
| 3,387,083 | 6/1968 | Farber et al. | 178/5.1 |
| 3,586,771 | 6/1971 | Hamburger | 325/308 |
| 3,693,090 | 9/1972 | Gabriel | 325/308 |
| 3,790,700 | 2/1974 | Callais et al. | 325/308 |

*Primary Examiner*—Maynard R. Wilbur
*Assistant Examiner*—S. C. Buczinski
*Attorney, Agent, or Firm*—Norman J. O'Malley; Robert E. Walrath; Cyril A. Krenzer

[57] ABSTRACT

A subscription television is disclosed wherein both subscription and non-subscription television system signals are distributed by a cable distribution system to a plurality of switching stations. Subscriber demand signals generated within one or more subscriber locations are detected within the switching station to couple subscription signals to the corresponding subscriber drops. Periodic interrogation signals cause the switching station to generate a return signal indicative of the presence of subscriber demand signals.

23 Claims, 7 Drawing Figures

SUBSCRIPTION TELEVISION SYSTEM AND SWITCHING STATION THEREFOR

BACKGROUND OF THE INVENTION

This invention relates generally to subscription television systems and a switching station for use therein and more particularly to a cable television system for distributing both subscription and non-subscription television signals to a plurality of subscribers. Numerous systems for distributing subscription television signals have been proposed in the prior art. The prior art systems, however, all suffer from a variety of disadvantages such as high complexity and attendant high costs, difficult or time consuming and expensive program selection and billing procedures, lack of security against unauthorized reception, deleterious effect on television signals, and numerous other similar disadvantages.

Most typical prior art subscription television systems involve the use of a set top converter of switching device intended to prevent reception of subscription television signals without payment or activation of billing procedures. In one category of systems punch cards inserted into the set-top unit activate switches and/or circuitry therein to couple a subscription television signal to the television receiver. These systems suffer from the disadvantages of requiring physical distribution of cards necessitating subscriber program decisions far ahead of the time such programs are distributed. Accordingly, in such systems if a subscriber is unable to view the program previously selected, or after observing a short portion of the program decides not to view it, the subscriber has already paid for or will be billed for a program which was not viewed. Similarly, a subscriber cannot readily view a program which was not preselected. These types of systems also involve complex coding schemes and frequent code changes to prevent discovery of the codes. Also, numerous codes are required to prevent a subscriber from compiling a set of coded cards and by trial and error obtain the subscription program without payment.

In other prior art systems coin operated set-top converters are utilized. These systems have the disadvantage of requiring physical collection of money in each subscriber's premises which is time consuming and greatly increases operating costs. Other known prior art systems include recording units which make tape records of program viewing. Such systems also involves physical collection of the tapes. Still other systems utilize digital communication techniques which generally lead to very high cost and limited acceptance.

Most prior art systems also lack security. The subscription signals are distributed via a cable which is coupled through house drops to the various set-top units in the various subscribers' premises. If a subscriber tampers with the set-top unit to enable reception without payment, discovery is difficult because physical inspection of the set-top unit is ordinarily required. Also, in systems wherein both subscription and non-subscription television signals are distributed, persons authorized to receive only the non-subscription television signals may utilize unauthorized equipment to receive the subscription television signals without payment. Some proposed systems utilize signal scrambling to partially circumvent unauthorized reception, however, such scrambling ordinarily involves the use of multiple channels thereby wasting channels which could be utilized for other purposes, expensive and complex unscrambling circuitry, deleterious effect on the received signals, and other similar disadvantages.

Other known prior art systems which involve recording units located external to the subscribers premises also suffer from numerous disadvantages such as deleterious effect on the television signals distributed, physical collection of tape records, request-response systems wherein the subscriber must make a telephone request for each program to be viewed, additional lines or connections for control signals or power, high cost and operating expense, signal loss due to temporary power interruption, excessive power consumption, and other similar disadvantages.

In summary, known prior art systems for distributing subscription television signals all suffer from numerous disadvantages which limit their utility and/or acceptance.

OBJECTS AND SUMMARY OF THE INVENTION

Accordingly, it is an object of this invention to provide a subscription television system which alleviates the above-noted and other disadvantages of the prior art.

It is a further object of this invention to provide a subscription television system with high security against unauthorized interception of the subscription television signals.

It is a further object of this invention to provide a subscription television system with automatic detection of subscribers receiving subscription television signals.

It is a further object of this invention to provide a subscription television system wherein the subscription television signals are discretionarily received without deleterious effect on the signals or on non-subscription signals distributed therewith.

It is a further object of this invention to provide a low cost switching station for a subscription television system.

It is a still further object of this invention to provide a switching station for a subscription television system through which discretionary coupling of subscription televison signals does not deleteriously affect the signals or non-subscription television signals distributed therewith.

It is a yet further object of this invention to provide a switching station for a subscription television system with high security and wherein unauthorized taps are readily discoverable.

It is a further object of this invention to provide a subscription television system and a switching station therefor wherein additional services can be readily incorporated.

It is a still further object of this invention to provide a switching station for a subscription television system incorporating simple and inexpensive switching circuitry.

These and other objects and advantages are achieved in one aspect of this invention in a switching station for a subscription television system wherein television signals are distributed via a cable. The switching station includes coupling means, signal splitting means, switching means, output means, sensing means, and interrogating means. The coupling means receives a composite signal including television signals and interrogation signals from the cable. The signal splitting means separates the received signals and couples the television signals to the switching means which couples the television signals therethrough in response to a switching signal. The output means provided the signals from the switching means to a subscriber drop cable. The sensing means is connected to the output means and to the switching means for providing a switching signal to the switching means when the presence of a subscriber demand signal from the subscriber drop cable is detected thereby. The interrogating means provides a signal to the coupling means indicative of the signal from the sensing means in response to the interrogation signals provided thereto by the signal splitting means.

In another aspect of this invention the above and other objects and advantages are achieved in a cable television system for distributing subscription and non-subscription television signals which includes first and second signal generating means, a cable distribution network, a plurality of switching stations, and return signal receiving means. The first signal generating means provides a plurality of non-subscription television signals and at least one subscription television signal. The second signal generating means sequentially provides a plurality of coded interrogation signals. The cable distribution network distributes the television signals and interrogation signals to a plurality of locations. The switching stations at respective ones of the locations to which the television signals are distributed each include coupling means, signal splitting means, a plurality of subscriber controlled switching means, a plurality of output means, a plurality of sensing means, and interrogating means. The coupling means is connected to receive the television signals and interrogation signals from the cable distribution network. The signal splitting means separates the signals and couples the subscription television signals to each of the plurality of switching means, the non-subscription television signals to each of the plurality of output means, and the interrogation signals to the interrogating means. Each of the output means combines the non-subscription television signals with subscription signals from a corresponding one of the switching means and couples the combined signal to a subscriber drop. Each of the sensing means detects the presence of a subscriber demand signal received via the corresponding drop and provides a switching signal to the corresponding one of the switching means. The interrogating means provides a return signal to the coupling means indicative of the signals provided by each of sensing means in response to an interrogation signal with a particular code. The return signal receiving means is connected to receive the return signals via the distribution network from each of the plurality of stations.

DETAILED DESCRIPTION OF THE PREFERRED EMBODIMENTS

For a better understanding of the present invention, together with other and further objects, advantages, and capabilities thereof, reference is made to the following disclosure and appended claims in connection with the above-described drawings.

Figure 1:
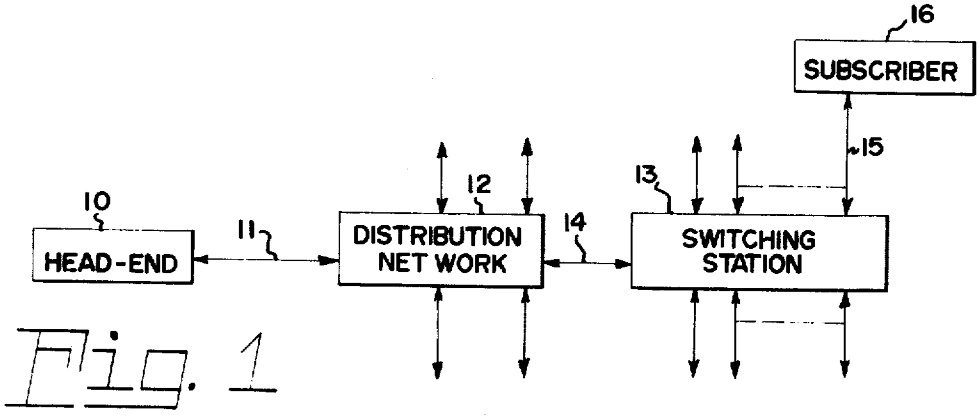
FIG. 1 is a block diagram of a subscription television system incorporating the invention.

FIG. 1 is a generalized block diagram of a subscription television system incorporating the invention. A central station or head-end 10 includes signal generating means which provide a composite signal including television signals and interrogation signals. In general, the television signals can include both subscription and non-subscription television signals. The signals from head-end 10 are conducted via a trunk cable 11 and a distribution network 12 to a plurality of locations. Distribution network 12 typically includes a combination of trunk cables, distribution cables, amplifiers, and other circuitry to distribute signals from head-end 10 throughout a community. Each of the plurality of locations includes a switching station in accordance with the invention.

In FIG. 1, switching station 13 is coupled to a distribution cable 14 and receives the composite signal therefrom. Switching station 13 has a plurality of subscriber drops coupled thereto of which subscriber drop 15 is illustrated as being connected to subscriber location or premises 16. The number of subscriber drops connected to each switching station will generally be determined by subscriber density. For example, some switching stations may be coupled to sixteen subscriber drops, some to more, and some to fewer as conditions dictate. Similarily, the general layout of distribution network 12 and the numbers and locations of switching stations will depend upon the physical layout of the community involved. Return signals generated within the various subscriber premises and within the various switching stations 13 are coupled via distribution network 12 and trunk cable 11 to a return signal receiving means within heat-end 10. In general, head-end 10 represents the location or locations from which the various signals are provided. All of the signals may be provided from the same location or from diverse locations.

Figure 2:
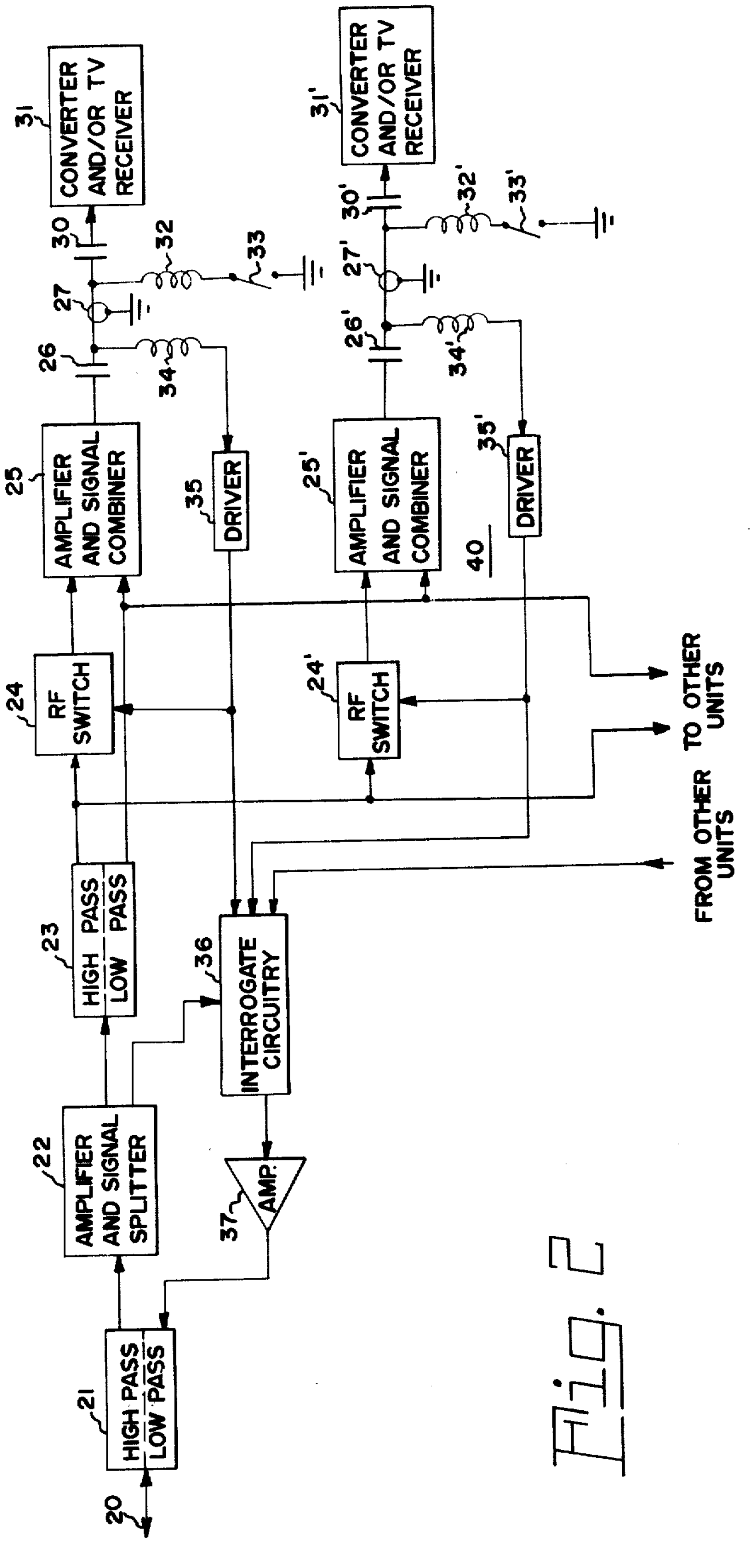
FIG. 2 is a block diagram of one embodiment of a switching station in accordance with the invention.

FIG. 2 is a block diagram of a switching station in accordance with the invention. An input means including a coupling means and signal splitting means receives the distributed signals. The coupling means includes an input connection 20 and a diplex filter 21 which receive the distributed signals from the distribution network. In the preferred embodiment, the signals distributed in the forward direction are in a band of frequencies including the VHF television channels while the return signals are at sub-VHF frequencies. Those skilled in the art will realize, however, that other frequencies assignment can be made. Accordingly, in the preferred embodiment the received signals are coupled through the high pass section of diplex filter 21 to a signal splitting means. The signal splitting means includes an amplifier and signal splitter 22 having an input coupled to the high pass section of diplex filter 21. Amplifier and signal splitter 22 amplify the received signal and separate the television signals from the interrogation signals. In the embodiment illustrated in FIG. 2 the signal splitting means also includes a diplex or complimentary filter 23 connected to the output of signal splitter 22 for receiving the television signals therefrom.

In a typical subscription television system, distribution of both subscription and non-subscription signals may be desired. In such systems filter 23 separates the subscription signal or signals from the non-subscription signals and couples the subscription signals to a switching means illustrated as a radio frequency (RF) switch 24 and the non-subscription signals to an output means including a signal combining means illustrated as amplifier and signal combiner 25 which also receives the output signal from RF switch 24. The output of signal combiner 25 is connected by a coupling means including a coupling capacitor 26 to a subscriber drop illustrated as a coaxial cable 27. If in a particular system only subscription signals are distributed, signal splitter 23 may be deleted and the television signals can be applied from signal splitter 22 to RF switch 24. Correspondingly, the signal combiner in block 25 can be deleted. Also, additional amplifiers can be advantageously utilized if necessary to maintain signal levels and minimize signal distortion.

Signal splitter 23 is illustrated as a diplex or complimentary filter having high pass and low pass sections, however, the particular design and arrangement of pass bands within signal splitter 23 will depend upon the frequency assignments or channels in which the subscription and non-subscription signals are placed. In typical two-way cable television systems the television signals distributed in the forward direction are at frequencies corresponding to the standard VHF channel allocations. Additional signals can be included at mid-band frequencies between the low-band and high-band VHF channel allocations and at super-band frequencies above the frequency of channel 13. The return signals are normally allocated frequencies in a sub-VHF band of below about 40 mHz.

In the preferred embodiment of this invention wherein both subscription and non-subscription television signals are distributed, the subscription television signals are preferably allocated channels above channel 13. Hence, the high pass section of signal splitter 23 passes the subscription television signals to RF switch 24 while the low pass section passes the non-subscription television signals to signal combiner 25. Alternatively, the subscription television signals can be assigned frequencies corresponding to one or more high-band VHF channels while the non-subscription television signals are assigned frequencies corresponding to the low-band VHF channels. Alternatively, other frequency assignments can be used as well such as assigning frequencies for the subscription television signals at mid-band VHf frequencies, low-band VHF frequencies, or elsewhere. Those skilled in the art will realize that the pass bands of the various sections of signal splitter 23 will necessarily correspond to the frequency allocations of the various signals.

Subscriber drop 27 is coupled via a terminal in the subscriber's location or premises and a coupling capacitor 30 to the subscriber's converter and/or television receiver 31. If all of the signals to be received by the subscriber are in channels receivable by the tuner in the television receiver, a converter is not necessary; otherwise a converter will be required to convert some or all of the signals to one or more channels receivable by the television receiver.

In operation, the non- subscription television signals are coupled from input 20 via the high-pass section of diplex filter 21, amplifier and signal splitter 22, the low-pass section of signal splitter 23, amplifier and signal combiner 25, and subscriber drop 27 to television receiver 31. The subscription television signals are received in a similar manner except that they are coupled via the high-pass section of signal splitter 23 to RF switch 24 which when open prevents reception of the subscription television signals by the subscriber's television receiver 31.

Subscriber drop 27 is also connected by a choke 32 in series with a signal generating means illustrated as a switch 33 to ground. Switching of switch 33 generates a subscriber demand signal which is coupled by choke 32, subscriber drop 27, and a choke 34 to a sensing means which senses the switching of switch 33, that is, the presence of a subscriber demand signal. In the illustrated embodiment closure of switch 33 completes a direct current path for the sensing means. Chokes 32 and 34 block RF television signals while capacitors 26 and 30 block DC currents to isolate the television signals and the subscriber demand signal.

The sensing means includes a detecting circuit and/or driver 35 which is triggered by closure of switch 33 to provide a switching signal to RF switch 24. The switching signal causes closure of RF switch 24 to couple the subscription television signals therethrough, and hence, to television receiver 31. To prevent inadvertent operation of switch 33, and hence, closure of RF switch 24 and reception of subscription television signals, switch 33 can be a key-operated switch. While in the illustrated embodiment the subscriber demand signal is generated by closure of switch 33, those skilled in the art will realize that other modes of operation can be used as well. For example, driver 35 can sense opening of switch 33. Also, switch 33 can be connected to a direct voltage source instead of ground.

When a subscriber receives subscription television signals, detection of such reception is provided by an interrogating means which includes interrogate or transponder circuitry 36. The output signal from driver 35 is coupled to interrogate circuitry 36 to provide a signal indicative of whether or not the subscriber connected to drop 27 is receiving the subscription television signals. Periodic interrogation signals distributed from head-end 10 via distribution network 12 are received by coupling means 20 and 21. The interrogation signals are separated from the television signals in signal splitter 22 and are coupled to interrogate circuitry 36. Upon reception of a interrogation signal including a particular code, interrogate circuitry 36 provides a return signal via amplifier 37 to the low-pass section of diplex filter 21. The return signal is indicative of whether or not driver 35 is providing a switching signal to RF switch 24, and hence, to interrogate circuitry 36. The interrogating means will be described more fully in connection with FIG. 4.

Each switching station preferably includes a plurality of switching units for servicing a like plurality of subscribers. In FIG. 2, a second switching unit 40 for servicing a second subscriber's premises includes components 24'–26' and 34'–35' connected to a second subscriber drop 27'. The components in switching unit 40 can be identical to the similarily numbered components in the first switching unit. Similarily, the second subscriber's premises includes components 30'–33' which can be similar to or identical to components 30–30 in the first subscriber's premises. The subscription and non-subscription television signals from signal splitter 23 are coupled to RF switch 24' and signal combiner 25' in switching unit 40 as well as to other similar switching units for servicing additional subscribers. Similarly, the output signal from driver 35' of switching unit 40, as well as the output signals from similar drivers in the additional switching units, is coupled to interrogate circuitry 36 which includes an indication thereof in the return signal.

Figure 3:
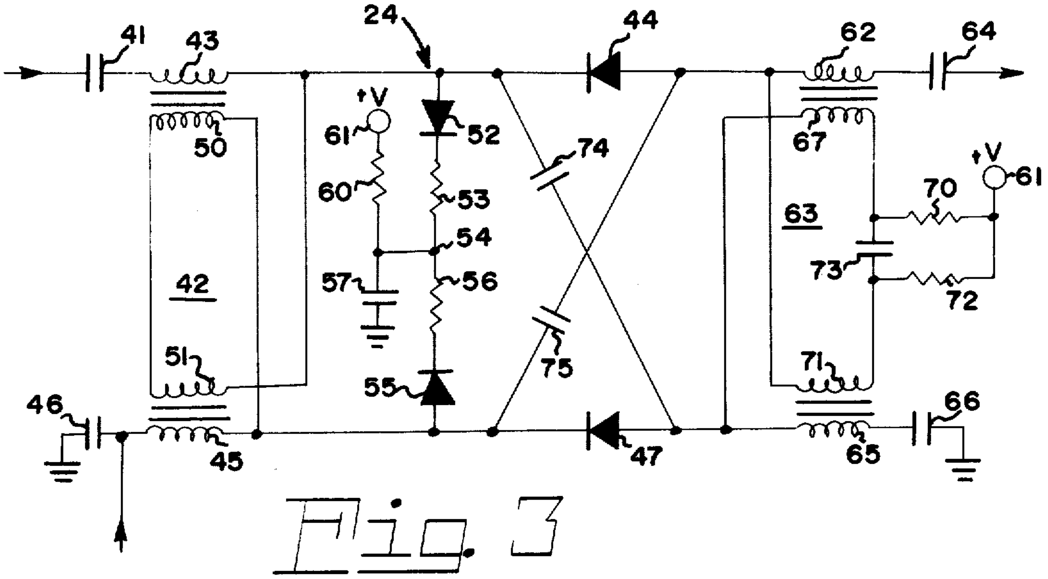
FIG. 3 is a schematic diagram of an RF switch in accordance with the invention.

FIG. 3 is a schematic diagram of the preferred embodiment of an RF switch suitable for use as RF switch 24. The input signal from signal splitter 23 is coupled via a coupling capacitor 41 to a balun transformer 42. Balun 42 has a first winding 43 connected in series between capacitor 41 and a diode 44, a second winding 45 having one end connected via a coupling capacitor 46 to circuit ground and the other end connected to a diode 47, a third winding 50 magnetically coupled to winding 43 and having one end connected to the junction between winding 45 and diode 47, and a fourth winding 51 magnetically coupled to winding 45 and having one end connected to the junction between winding 43 and diode 44 and the other end connected to the free end of winding 50. The junction of winding 43 and diode 44 is further connected by a diode 52 in series with a resistor 53 to a junction 54. The junction between winding 45 and diode 47 is connected by a diode 55 in series with a resistor 56 to junction 54 which is further connected by a capacitor 57 to circuit ground. Junction 54 is further connected by a resistor 60 to a source of positive energizing potential illustrated as a terminal 61.

The output of diode 44 is connected by a first winding 62 of an output balun transformer 63 in series with a coupling capacitor 64 to amplifier and signal combiner 25. Balun 63 has a second winding 65 having one end connected to the output side of diode 47 and the other end connected by a coupling capacitor 66 to circuit ground, a third winding 67 magnetically coupled to winding 62 having one end connected to the output side of diode 47 and the other end connected by a resistor 70 to source 61, a fourth winding 71 magnetically coupled to winding 65 having one end connected to the output side of diode 44 and the other end connected by a resistor 72 to source 61. A capacitor 73 is connected between the junction of winding 67 and resistor 70 and the junction of winding 71 and resistor 72. A first compensation capacitor 74 can be connected between the input side of diode 44 and the output side of diode 47, and a second compensation capacitor 75 can be connected between the input side of diode of 47 and the output side of diode 44, if necessary. The input of switching signal from the driver 35 is coupled between winding 45 and capacitor 46.

In operation the subscription television signals are applied via capacitor 41 and balun 42 to diodes 44 and 47. If the switching signal from driver 35 is more positive than the voltage of source 61, diodes 44 and 47 will be reverse biased and the subscription television signals will not be coupled therethrough. Similarily, the positive switching will forward bias diodes 52 and 55 to provide a simulated load to signal splitter 23. The switching voltage from driver 23 can be, for example, twice the voltage of source 61.

To close RF switch 24, driver 35 provides a low voltage such as circuit ground. Current will then flow from source 61 through resistor 70, winding 67, diode 47, and winding 45 to forward bias diode 47. Similarily, current will flow from source 61 through resistor 72, winding 71, diode 4, winding 51, winding 50, and winding 45 to forward bias diode 44. Diodes 52 and 55 will be reverse biased tto remove the simulated load. In the preferred embodiment diodes 44, 47, 52, and 55 are PIN diodes to provide a low distortion RF switch.

While a particular form of RF switching circuitry has been illustrated and described, those skilled in the art will realize that other forms of RF switches can be employed satisfactorily as Rf switch 24. Also, those skilled in the art will realize that other forms of switching means can be utilized. For example signal suppression techniques can be satisfactorily used wherein television signals in one or more subscription channels are suppressed by signal cancellation or distortion techniques or otherwise rendered unviewable on the screen of a television receiver. In such switching means switch closure is effected by removing the suppression, cancellation, or distortion signal. Such techniques may be advantageously employed where the subscription signals are in a VHF television channel normally receivable on an ordinary television receiver, e.g., channel 13. When such techniques are used, signal splitter 23 and combiner 25 can be deleted and the subscription signal can be suppressed from the output signals from amplifier 22.

Figures 4, 7:
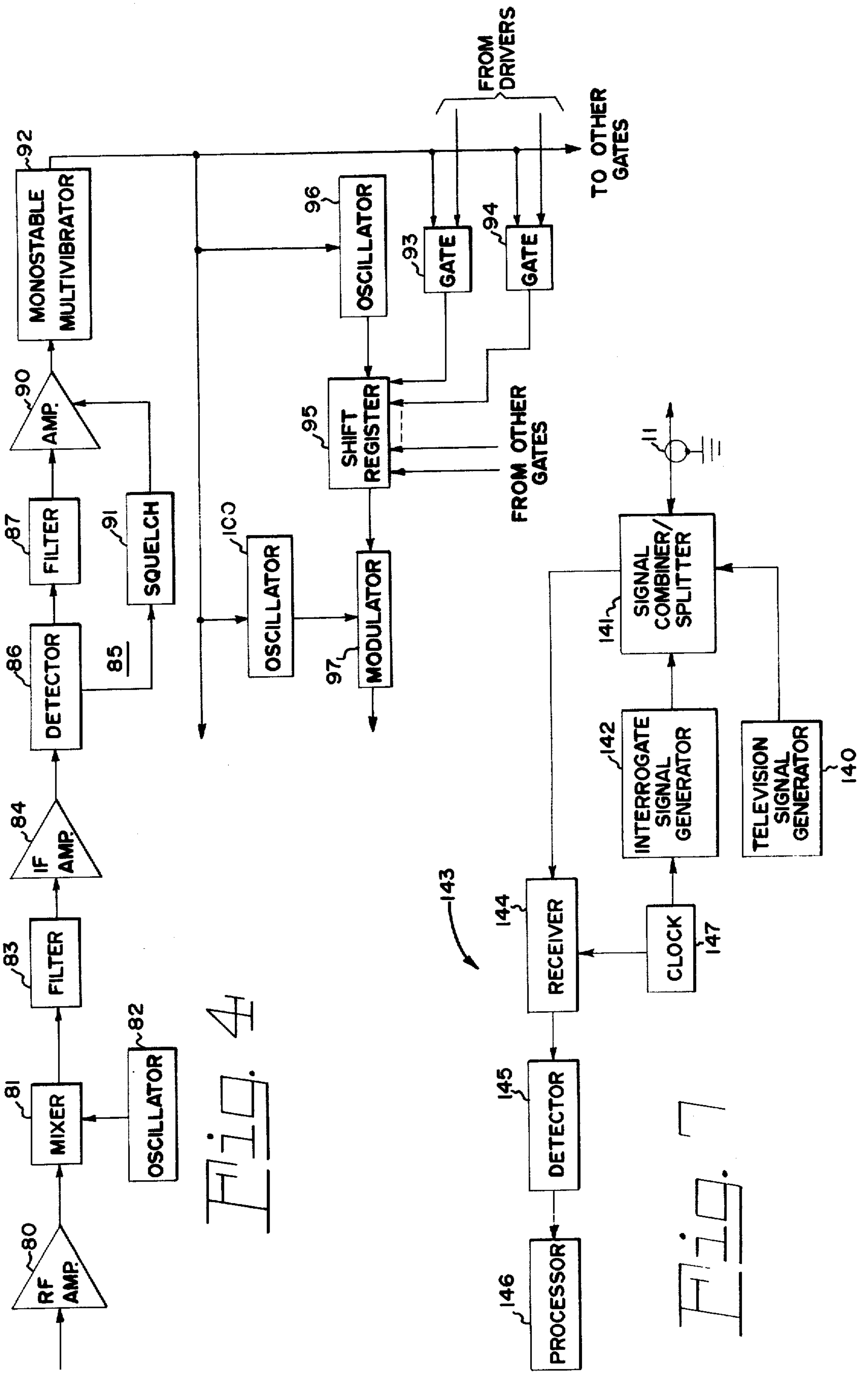
FIG. 4 is a block diagram of an interrogation means in accordance with the invention.
FIG. 7 is a block diagram of signal generating and receiving means in accordance with the invention.

FIG. 4 is a detailed block diagram of interrogating means in accordance with the invention. The RF modilated interrogation signals are coupled from signal splitter 22 to an Rf amplifier 80. The interrogation signals may be at any suitable frequency such as mid-band VHF or in the guard band between the subscription and non-subscription television signals. Amplifier 80 comprises the input means of a receiving means for detecting the interrogation signals. The receiving means includes a mixer 81 connected to the output of amplifier 80 and an oscillator 82 connected to mixer 81 to heterodyne the received interrogation signal to an IF frequency, a filter 83 connected to receive the signal from mixer 81, an IF amplifier 84 connected to the output of filter 83, and a code detecting means 85 connected to the output of amplifier 84. The code detecting means includes a frequency discriminator or detector 86 connected to receive the IF signal from amplifier 84, a filter 87 connected to the output of detector 86, and an amplifier 90 connected to the output of filter 87. a squelch circuit 91 is connected between detector 86 and amplifier 90 to disable amplifier 90 in the absence of a received carrier signal.

In the preferred embodiment the code detecting means of each of the switching stations connected to distribution network 12 responds to a different frequency. Accordingly, the interrogation signals sequentially transmitted from head-end 10 can be frequency coded so that each switching station responds in its proper sequence. Accordingly, when the interrogation signal of the proper frequency code is received, amplifier 90 provides an output signal to trigger a monostable multivibrator 92.

Between interrogation intervals output signals from the various drivers such as 35 and 35' in switching station 13 are coupled via respective gates such as gates 93 and 94 to a shift register 95. The output signal from each driver sets one bit in shift register 95 when a switching signal is being provided to RF switch 24.

The output signal from multivibrator 92, which comprises a pulse of a predetermined duration, is coupled to an oscillator 96 which in response thereto provides a series of pulses to shift register 95 to cause the contents thereof to shift serially to a modulating means including a modulator 97 and an oscillator 100 connected thereto. During the shifting operation, the pulse from multivibrator 92 is coupled to gates 93 and 94 and other similar gates associated with other switching units in the switching statin to inhibit the gates so that the output signals from the drivers do not interfere with the shifting operation. Accordingly, shift register 95 and oscillator 96 comprise a signal generating means for providing a signal indicative of the signals from each of the drivers. Oscillator 100 is enabled by the pulse from multivibrator 92 to provide a signal to modulator 97 which modulates the serial pulse train from shift register 95. Accordingly, modulator 97 and oscillator 100 comprise a modulating means for modulating the signal from shift register 95. Modulator 97 can be, for example, a phase shift keyed (FSK) modulator. The output signal from modulator 97 comprises a return signal which is coupled to the low pass section of diplex filter 21. The return signal is coupled via distribution network 12 back to head-end 10.

At the end of the pulse from multivibrator 92, oscillators 96 and 100 are disabled and the gates such as gates 93 and 94 are enabled so that the signals from the various drivers reset the stages or bits of shift register 95. Since return signal amplifier 37 is used only during the interrogation interval, in the preferred embodiment amplifier 37 is enabled by the pulse from multivibrator 92 and disabled at other times to prevent the generation of noise which otherwise might be coupled to distribution network 12.

While a particular form of signal coding was used for the interrogation signals, those skilled in the art will realize that other forms of coding can also be used within the scope of the invention. Also, those skilled in the art will realize that other forms of signal generating means and modulating means can be used to provide the return signal. Other further modifications will also be evident to those skilled in the art. For example, shift register 95 can be provided with a fixed-wired address code of N bits so that the return signal receiving means at head-end 10 can determine whether the proper switching station responded to the transmitted interrogation signal. Parity checking can also be incorporated, if desired.

It should be noted that switching station 13 can be operated in other modes as well. For example, during times when subscription television signals are not being transmitted, the subscriber demand switches 33 may be operated by the subscribers in a voting mode or shopping-at-home mode in response to program material provided via the non-subscription television channels. In addition or alternatively, the subscriber demand switches may be operated in an alarm mode during times when subscription television signals are not being transmitted or during other extended periods such as vacation periods. In this mode the subscriber demand switches or switches in parallel therewith can be operated by detectors such as fire detectors, burglar detectors, and other similar means to provide protective services to the subscriber's premises. While voting mode and alarm mode operation may be achieved with the circuitry of FIG. 2, additional flexibility can be incorporated into switching station 13 and the subscriber's premises.

Figure 5:
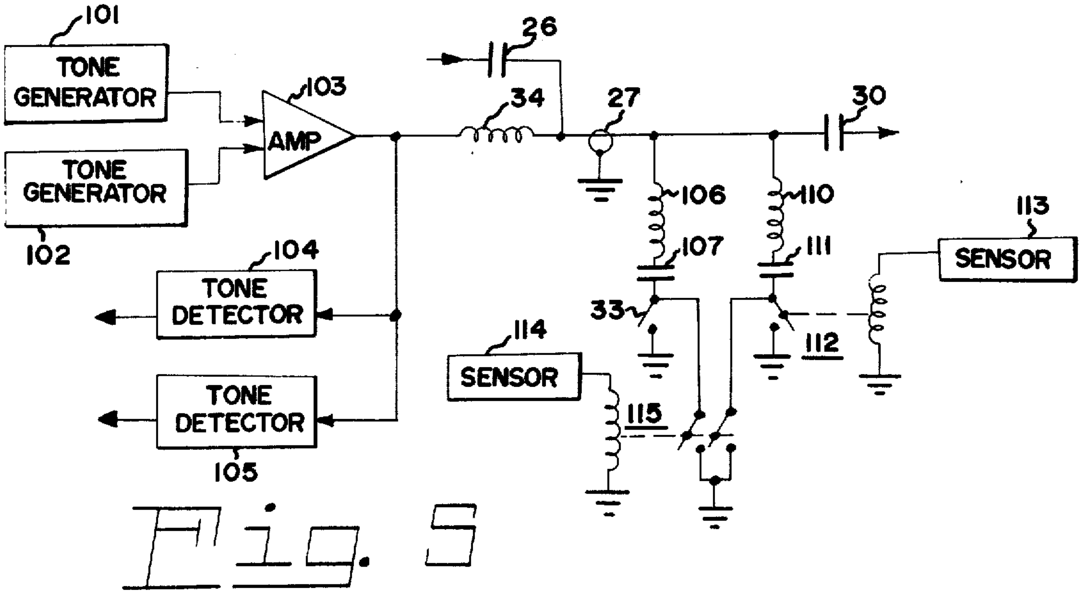
FIG. 5 is a block and schematic diagram of a sensing and demand signal generating means in accordance with the invention.

FIG. 5 illustrates a block and schematic diagram of sensing means and means for generating subscriber demand or alarm signals for providing extended alarm capabilities. First and second signal generating means illustrated as tone generators 101 and 102 provide low frequency output signals which can be, for example, on the order of 100–200 Hz. The output signals from tone generators 101 and 102 are summed by amplifier 103 and coupled via choke 34 to subscriber drop 27. The output signal from amplifier 103 is also coupled to a detecting means illustrated as first and second detecting circuits or tone detectors 104 and 105.

In the subscriber's premises drop 27 is coupled by a frequency selective circuit illustrated as a coil 106 in series with the capacitor 107 to subscriber demand switch 33. Closure of switch 33 grounds the frequency selective circuit including coil 106 and capacitor 107 to modify the output from tone generator 101. The modification of the low frequency tone from tone generator 101 is detected by detector 104 which provides a switching output signal to RF switch 24 and a signal to interrogate circuitry 36 of FIG. 2.

A second frequency selective circuit illustrated as a coil 110 in series with the capacitor 111 is further connected in series with a switching means illustrated as the contacts of a relay 112 to circuit ground. A sensing means or sensor 113 such as a fire or smoke detector provides an energizing signal to the winding of relay 112 to cause closure of the contacts thereof and grounding of the frequency selective circuit including coil 110 and capacitor 111 which modifies the tone signal provided by generator 102. Modification of the tone provided by generator 102 is detected by detector 105 to provide an output signal to interrogate circuitry 36 in addition to the output signal provided by detector 104. Accordingly, each sensing means for each switching unit will provide two signals to interrogate circuitry 36. In FIG. 4, shift register 95 is expanded to include the additional alarm bit so that each switching station provides two bits of information.

In FIG. 5, the subscriber's premises can include an additional sensing means or sensor 114 which provides an output signal to a winding of a relay 115 which has two sets of contacts. The first set of contacts of relay 115 is connected in parallel with switch 33 while the second set is connected. in parallel with the contacts of relay 112. Accordingly, energization of the winding of relay 115 causes both of detectors 104 and 105 to provide output signals. Sensor 114 can be a intrusion detection system which normally will not be utilized by the subscriber during viewing of subscription television signals. Those skilled in the art will realize that various other modifications and additional features can be readily incorporated into the disclosed system. As was noted above, detectors 104 and 105 can detect the opening of switch 33 or the contacts of relays 112 and 115 instead of closure thereof. In an alarm mode of operation detecting opening of the contacts of relays 112 and 115 may be preferable.

In a subscription television system utilizing switching stations in accordance with that illustrated in FIG. 2, one or more subscription television signals may be distributed and coupled through RF switch 24. Since the system operator cannot determine which subscription television signal the subscriber is viewing, the billing rate must be uniform for all subscription television signals distributed during a given time period. If different rates are desired, a switching station incorporating switching units in accordance with that disclosed in FIG. 6 can be utilized.

Figure 6:
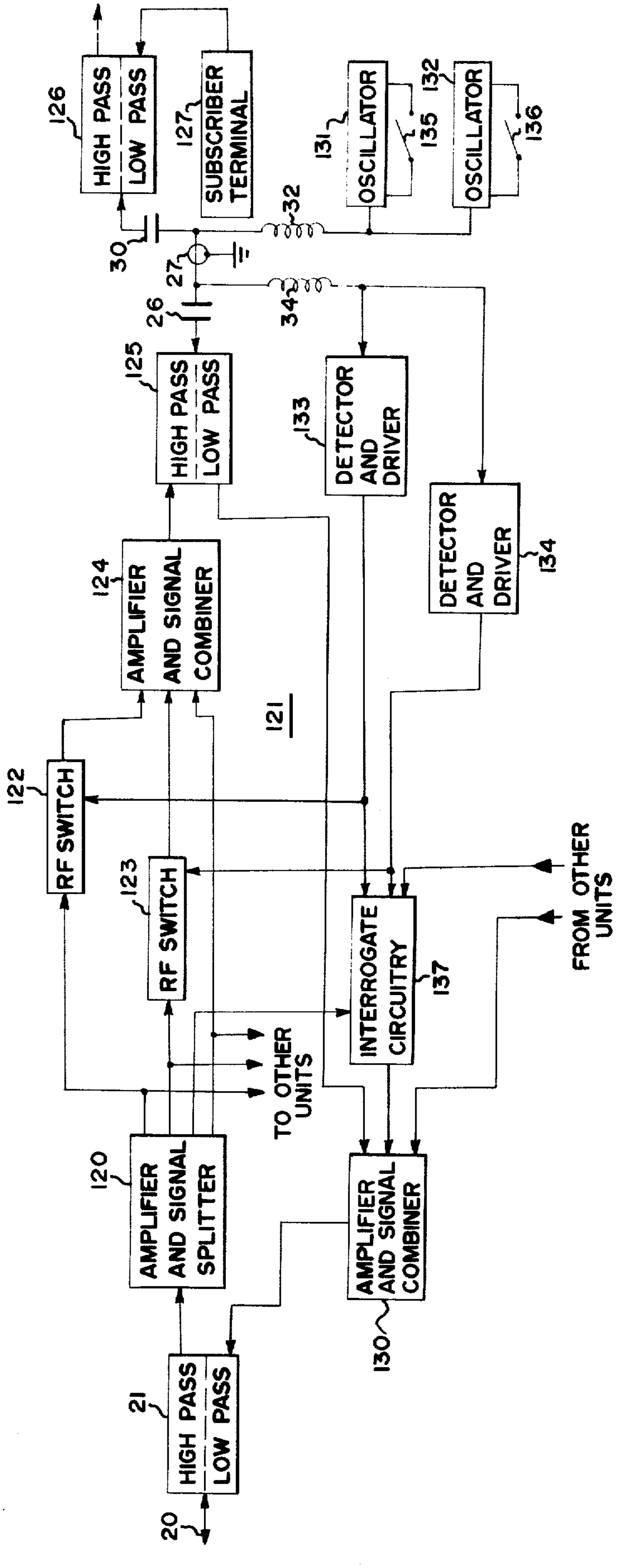
FIG. 6 is a block diagram of another embodiment of a switching station in accordance with the invention.

In FIG. 6, an input means including a coupling means 20 and 21 similar to that shown in FIG. 2 and signal splitting means illustrated an amplifier and signal splitter 120 are connected to receive the television signals and the interrogation signals from the cable distribution network. Signal splitter 120 separates the subscription television signals, the non-subscription television signals, and the interrogation signals. The subscription television signals and the non-subscription television signals are coupled to each of the switching units in switching station 13 of which only switching unit 121 is illustrated.

Switching unit 121 includes a first switching means illustrated as an RF switch 122, which can be in accordance with that shown in FIG. 3, connected to receive from signal splitter 120 the subscription television signal or signals to be billed at a first rate. A second switching means illustrated as an RF switch 123 is similarily connected to receive from signal splitter 120 subscription television signals to be billed at a second rate. The output signals from switches 122 and 123 are coupled to a signal combining means illustrated as an amplifier and signal combiner 124 which is also connected to signal splitter 120 to receive the non-subscription television signals therefrom. The output means including signal combining means 124 can further include a diplex filter 125 connected between signal combiner 124 and coupling capacitor 26. The television signals from signal combiner 124 are coupled via the high pass section of diplex filter 124 and capacitor 26 to subscriber drop 27. Subscriber drop 27 is coupled by capacitor 30 to a diplex filter 126 within the subscriber's premises. The television signals are coupled through the high pass section of diplex filter 126 to the subscriber's television receiver.

As an additional feature of the applicant's invention, the subscriber is provided with a subscriber terminal 127 which provides output signals coupled via the low pass section of diplex filter 126, subscriber drop 27, the low pass section of diplex filter 125 to an amplifier and signal combiner 130. Amplifier and signal combiner 130 combines the return signal from subscriber terminal 127 with similar signals from other switching units as well as the return signal from the interrogate circuitry to form a combined return signal. The return signal is coupled from amplifier 130 via the low pass section of diplex filter 21 to distribution network 12. If a subscriber terminal is not desired, diplex filters 125 and 126 can be deleted. Subscriber terminal 127 can be used for various special services as desired.

FIG. 6 also illustrates an alternate embodiment of the subscriber demand signal generating means and sensing means. First and second generating means illustrated as oscillators 131 and 132 are located within the subscriber's premises. The output signals from oscillators 131 and 132 are coupled via choke 32, subscriber drop 27, and choke 34 to the sensing means illustrated as detecting circuits and drivers 133 and 134. A first subscriber demand switch 135 is connected to oscillator 131 and a second subscriber demand switch 136 is connected to oscillator 132.

Closure or opening of switch 135 causes oscillator 131 to provide a first low frequency tone which is detected by detector 133 to provide a switching signal to RF switch 122. Similarily, closure or opening of switch 136 causes oscillator 132 to provide a second low frequency tone which is detected by detector 134 to provide a switching signal to RF switch 123. Alternatively, sensing means and subscriber demand signal generating means similar to that illustrated in FIG. 5 can be used with the embodiment illustrated in FIG. 6. As a further alternative multi-level DC signals can be provided, for example, by selectively connecting the subscriber drop to different terminals of a voltage divider circuit while detectors 133 and 134 detect the different DC levels.

Interrogating means illustrated as interrogate circuitry 137 of FIG. 6 receives the switching signals from drivers 133 and 134. Interrogate circuitry 137 is preferably similar to that illustrated in FIG. 4. Since amplifier and signal combiner 130 may be receiving continuous return signals from the various subscriber terminals, amplifier and signal combiner 130 is preferably continuously operating. If no subscriber terminals are desired, amplifier 130 can be the same as amplifier 37 of FIG. 2.

FIG. 7 is a block diagram illustrating signal generating and return signal receiving means which can be incorporated into head-end 10. A first signal generating means illustrated as a television signal generator 140 provides a plurality of non-subscription television signals and at least one subscription television signal to signal combiner/splitter 141. A second signal generating means illustrated as an interrogate signal generator 142 sequentially provides at spaced intervals a plurality of coded interrogation signals to signal combiner 141. Signal combiner 141 combines the television signals with the interrogation signals into a composite signal which is coupled to trunk cable 11. Return signals from trunk cable 11 are separated by signal splitter 141 and coupled to return signal receiving means 143 illlustrated as a signal receiver 144 which provides an output signal to a detector 145 which detects the return signals. Receiver 144 and detector 145 may be generally similar to that illustrated in FIG. 4. The detected output signals are coupled to a processor 146. Processor 146 determines which subscribers are viewing subscription televison signals and can be utilized to prepare billing statements. A clock 147 is also provided to enable interrogate signal generator 142 and receiver 144 at appropriate times.

Accordingly, there has been shown and described various embodiments, modifications, and variations of a subscription television system and a switching station therefor. Apparatus in accordance with the invention possesses numerous advantages over that known in the prior art. For example, the switching stations may be readily located external to any subscriber's premises. Unauthorized reception of subscription television signals is readily detectable because the interrogate circuitry within the switching station will provide a positive indication of such viewing. Furthermore, tampering with the switching station can be readily determined because each switching station is located within the cable television system and not in a subscriber's premises. Also, security is provided in a switching station which does not deleteriously affect the television signals distributed by the system, but yet, is relatively inexpensive and simple. Another advantage is that after a power interruption the subscription signals are automatically returned to those subscribers who were viewing them. This is particularly advantageous after a momentary power interruption. Also, the subscriber demand signals are provided via the house drop itself and not by separate wires or connections. When alarm service is provided, the alarm system can be powered at least in part from the switching station so that an intruder cannot as readily defeat the alarm system. While some of the various advantages provided by the invention have been described, those skilled in the art will realize that there are numerous other advantages as well. Furthermore, various functions and features beyond distribution of subscription television signals have been disclosed in various arrangements. These various functions and features may be incorporated into a switching station and system in various combinations within the scope of the invention.

While there has been shown and described what is at present considered the preferred embodiments of the invention, it will be obvious to those skilled in the art that various changes and modifications may be made therein without departing from the scope of the invention as defined by the appended claims.

What is claimed is:

1. In a subscription television system wherein television signals are distributed via a cable, a switching station comprising:

coupling means for connection to said cable for receiving a composite signal including television signals and interrogation signals;

signal splitting means connected to said coupling means for separating the received signals;

switching means connected to said signal splitting means for receiving said television signals and for coupling said television signals therethrough in response to a switching signal;

output means connected to said switching means for providing signals to a subscriber drop cable;

sensing means connected to said output means and to said switching means for providing a switching signal to said switching means when the presence of a subscriber demand signal from the subscriber drop cable is detected thereby; and interrogating means connected to said coupling means, said signal splitting means, and said sensing means for providing a signal to said coupling means indicative of the signal from said sensing means in response to said interrogation signals.

2. A switching station as defined in claim 1 wherein said sensing means includes means for detecting switching of a switch coupled to said output means.

3. A switching station as defined in claim 1 wherein said television signals include subscription and non-subscription television signals, said signal splitting means separates said subscription television signals from said non-subscription television signals and couples said subscription television signals to said switching means, and said output means includes signal combining means connected to said switching means and said signal splitting means for recombining said subscription and non-subscription television signals.

4. A switching station as defined in claim 1 wherein said interrogating means includes receiving means connected to said signal splitting means for detecting said interrogation signals, signal generating means connected to said sensing means and to said receiving means for providing a signal indicative of the signal from said sensing means in response to a signal from said receiving means, and modulating means connected to said signal generating means and to said coupling means for modulating the signal from said signal generating means and for providing the modulated signal to said coupling means.

5. A switching station as defined in claim 1 wherein said television signals include first and second subscription television signals, said switching means includes first and second switching circuits connected to said signal splitting means for receiving said first and second subscription television signals, respectively, said sensing means includes first and second detecting circuits for detecting the presence of first and second subscriber demand signals, respectively, for providing switching signals to said first and second switching circuits, respectively, and a signal provided by said interrogating means is indicative of the signals provided by said first and second detecting circuits.

6. A switching station as defined in claim 1 wherein said switching means includes a PIN diode switching circuit.

7. A switching station as defined in claim 6 wherein said switching circuit includes first and second PIN diodes connected between an input and an output of said switching circuit, third and fourth PIN diodes connected to said input of said switching circuit for providing a simulated load, and means coupling said switching signal to each of said PIN diodes for forward biasing said first and second PIN diodes and reverse biasing said third and fourth PIN diodes when a subscriber demand signal is detected and for reversing the bias on each of said PIN diodes when no subscriber demand signal is detected.

8. In a subscription television system wherein subscription and non-subscription television signals are distributed from a central station via a cable distribution network to a plurality of subscribers, a switching station comprising:

first coupling means for connection to said cable for receiving a composite signal including said television signals and interrogation signals from said cable and for providing return signals to said cable;

signal splitting means connected to said first coupling means for separating the received signals;

a plurality of switching means each connected to said signal splitting means for receiving said subscription television signals therefrom;

a plurality of signal combining means each connected to said signal splitting means for receiving said non-subscription television signals and to respective ones of said switching means;

a plurality of second coupling means connected to respective ones of said signal combining means for providing television signals to respective subscriber drops;

a plurality of sensing means connected to respective ones of said second coupling means and to respective ones of said switching means each for providing a switching signal to the corresponding one of said switching means when the presence of a subscriber demand signal is detected thereby; and interrogating means connected to said signal splitting means for receiving said interrogation signals therefrom, to each of said sensing means, and to said first coupling means for providing a return signal indicative of the signals from said sensing means in response to said interrogation signals.

9. A switching station as defined in claim 8 wherein each of said sensing means includes means for detecting switching of a switch coupled to the respective one of said second coupling means.

10. A switching station as defined in claim 8 wherein each of said switching means includes first and second switching circuits connected to said signal splitting means for receiving respective ones of first and second subscription television signals, each of said sensing means includes first and second detecting circuits connected to respective ones of said first and second switching circuits for providing a switching signal to the corresponding one of said switching circuits upon detecting the presence of first and second subscriber demand signals, respectively, and said interrogating means provides a return signal indicative of the signals provided by said first and second detecting circuits of each of said sensing means.

11. A switching station as defined in claim 10 wherein each of said switching circuits includes a first PIN diode connected between an input and an output thereof, a second PIN diode connected between the input and a reference point for providing a simulated load, and means coupling said switching signal to said first and second PIN diodes for forward biasing said first PIN diode and reverse biasing said second PIN diode when a subscriber demand signal is detected and for reversing the bias on said first and second PIN diodes when no subscriber demand signal is detected.

12. A switching station as defined in claim 8 wherein each of said sensing means includes a first detecting circuit connected to the respective one of said switching means for providing a signal thereto when the presence of a subscriber demand signal is detected, and a second detecting circuit for providing a signal when the presence of a subscriber alarm signal is detected, and said interrogating means provides a return signal indicative of the signals from said first and second detecting means.

13. A switching station as defined in claim 12 wherein each of said sensing means includes first and second signal generators for generating first and second signals and said first and second detector circuits detect modification of the first and second signals by switching of switches coupled to the corresponding subscriber drop.

14. A switching station as defined in claim 8 wherein said interrogating means includes receiving means connected to said signal splitting means for detecting said interrogation signals, signal generating means connected to each of said sensing means and to said receiving means for providing a a signal indicative of the signals from each of said sensing means, and modulating means connected to said signal generating means and to said first coupling means for modulating the signal from said signal generating means and for providing the modulated signal to said first coupling means.

15. A switching station as defined in claim 14 wherein said signal generating means includes a shift register having a plurality of stages wherein the state of each stage is controlled by the corresponding signal from one of the sensing means and the signal provided by said signal generating means is provided by shifting said shift register.

16. A cable television system for distributing subscription and non-subscription television signals comprising:

first signal generating means for providing a plurality of nonsubscription televison signals and at least one subscription television signal;

second signal generating means for sequentially providing a plurality of coded interrogation signals;

a cable distribution network connected to said first and second signal generating means for distributing said television signals and said interrogation signals to a plurality of locations;

a plurality of switching stations each at a respective one of said locations and each including coupling means connected to receive said telivision signals and said interrogation signals from said cable distribution network, signal splitting means connected to said input means for separating said subscription television signal, said non-subscription television signals, and said interrogation signals, a plurality of subscriber controlled switching means each connected to said signal splitting means for receiving said subscription telivision signals therefrom, a plurality of output means each including signal combining means and each connected to said signal splitting means and to a respective one of said switching means for combining said non-subscription television signals with subscription television signals from the corresponding one of said switching means and for coupling the combined signal to a subscriber drop, a plurality of sensing means each connected to a respective one of said output means for detecting the presence of a subscriber demand signal received via the corresponding subscriber drop and connected to the corresponding one of said switching means for providing a switching signal thereto, and interrogating means connected to each of said sensing means for receiving signals therefrom and connected to said signal splitting means for receiving the interrogation signals therefrom and for providing a return signal to said coupling means indicative of the signals provided by each of said sensing means in response to an interrogation signal with a particular code; and return signal receiving means connected to receive the return signals via said distribution network from each of said plurality of switching stations.

17. A system as defined in claim 16 further including a switch in each subscriber location coupled to the respective one of said sensing means, and wherein each of said sensing means detects switching of the corresponding switch.

18. A system as defined in claim 16 wherein said first signal generating means provides a plurality of subscription television signals, said signal splitting means separates said plurality of subscription television signals into separate signals, each of said switching means includes a plurality of switching circuits each connected to said signal splitting means for receiving a respective one of said plurality of subscription television signals, each of said sensing means includes a plurality of detecting circuits connected to said interrogating means and to respective ones of said switching circuits for detecting the presence of respective ones of a plurality of subscriber demand signals, and said interrogating means provides a return signal indicative of the signal from each of said plurality of detecting circuits.

19. A system as defined in claim 18 further including a plurality of subscriber demand signal generators each including a switch for providing said demand signals to said detecting circuits upon switching of the corresponding one of said switches.

20. A system as defined in claim 19 wherein said subscriber demand signal generators are located in said switching station and the corresponding switches are located in the corresponding subscriber's premises.

21. A system as defined in claim 19 wherein said subscriber demand signal generators are located in the corresponding subscriber's premises.

22. A system as defined in claim 16 wherein said interrogating means includes receiving means connected to said signal splitting means for detecting said interrogation signals, signal generating means connected to each of said sensing means and to said receiving means for providing a signal indicative of the signals from each of said sensing means, and modulating means connected to said signal generating means and to said coupling means for modulating the signal from said signal generating means and for providing the modulated signal to said coupling means.

23. A system as defined in claim 22 wherein said signal generating means includes a shift register having a plurality of stages wherein the state of each stage is controlled by the corresponding signal from one of the sensing means and the signal provided by said signal generating means is provided by shifting said register.

* * * * *